United States Patent
Huang et al.

(10) Patent No.: US 10,411,584 B2
(45) Date of Patent: Sep. 10, 2019

(54) START-UP CIRCUIT TO DISCHARGE EMI FILTER FOR POWER SAVING OF POWER SUPPLIES

(71) Applicant: SEMICONDUCTOR COMPONENTS INDUSTRIES, LLC, Phoenix, AZ (US)

(72) Inventors: Wei-Hsuan Huang, Taoyuan County (TW); Meng-Jen Tsai, Hsinchu (TW); Chien-Yuan Lin, Taipei (TW); Ming-Chang Tsou, Yilan County (TW); Chuan-Chang Li, Hsinchu (TW); Gwo-Hwa Wang, Taipei (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/222,401

(22) Filed: Dec. 17, 2018

(65) Prior Publication Data

US 2019/0123633 A1     Apr. 25, 2019

Related U.S. Application Data

(63) Continuation of application No. 13/870,177, filed on Apr. 25, 2013, now Pat. No. 10,193,435, which is a
(Continued)

(51) Int. Cl.
*G05F 1/10* (2006.01)
*G05F 3/02* (2006.01)
(Continued)

(52) U.S. Cl.
CPC .............. *H02M 1/14* (2013.01); *H02M 1/126* (2013.01); *H02M 1/36* (2013.01); *H02M 2001/322* (2013.01)

(58) Field of Classification Search
CPC .... H02M 1/36; H02M 3/33507; H02M 7/517; H02M 2001/0006; H02H 9/001
See application file for complete search history.

(56) References Cited

U.S. PATENT DOCUMENTS

| 4,567,539 A | 1/1986 | Sinberg |
| 4,855,722 A | 8/1989 | Mostyn et al. |

(Continued)

FOREIGN PATENT DOCUMENTS

| JP | 10-185965 | 7/1998 |
| JP | 2000-184718 | 6/2000 |

(Continued)

OTHER PUBLICATIONS

Hung-I Hsieh et al., "Effects of X Capacitors on EMI Filter Effectiveness," IEEE Transactions on Industrial Electronics, vol. 55, No. 2, Feb. 2008, pp. 949-955.
(Continued)

*Primary Examiner* — Nguyen Tran
*Assistant Examiner* — Monica Mata
(74) *Attorney, Agent, or Firm* — Robert F. Hightower

(57) ABSTRACT

A start-up circuit to discharge EMI filter is developed for power saving. It includes a detection circuit detecting a power source for generating a sample signal. A sample circuit is coupled to the detection circuit for generating a reset signal in response to the sample signal. The reset signal is utilized for discharging a stored voltage of the EMI filter.

19 Claims, 3 Drawing Sheets

Related U.S. Application Data continuation of application No. 12/539,722, filed on Aug. 12, 2009, now Pat. No. 8,461,915.

(60) Provisional application No. 61/217,799, filed on Jun. 3, 2009.

(51) Int. Cl.
*H02M 1/14* (2006.01)
*H02M 1/12* (2006.01)
H02M 1/32 (2007.01)
H02M 1/36 (2007.01)

(56) References Cited

U.S. PATENT DOCUMENTS

| | | |
|---|---|---|
| 5,181,159 A | 1/1993 | Peterson et al. |
| 5,285,369 A | 2/1994 | Balakrishnan |
| 5,313,381 A | 5/1994 | Balakrishnan |
| 5,461,303 A | 10/1995 | Leman et al. |
| 6,107,851 A | 8/2000 | Balakirshnan et al. |
| 6,259,618 B1 | 7/2001 | Liaw et al. |
| 6,456,044 B1 | 9/2002 | Darmawaskita |
| 6,906,934 B2 | 6/2005 | Yang et al. |
| 7,046,529 B2 | 5/2006 | Chang |
| 7,773,678 B2 | 8/2010 | Marsili |
| 8,115,457 B2 | 2/2012 | Balakrishnan et al. |
| 8,369,051 B2 | 2/2013 | Skatulla |
| 8,461,915 B2 | 6/2013 | Huang et al. |
| 2004/0004798 A1 | 1/2004 | Priest |
| 2006/0050448 A1 | 3/2006 | Krug |
| 2007/0247879 A1 | 10/2007 | Yang |
| 2010/0321104 A1 | 1/2010 | Busch |

FOREIGN PATENT DOCUMENTS

| | | |
|---|---|---|
| JP | 2001-306160 | 2/2001 |
| JP | 2011-036124 | 2/2011 |
| WO | 2008086891 A1 | 7/2008 |

OTHER PUBLICATIONS

Texas Instruments, "2004/05 Power Supply Design Seminar," 2004, 191 pages.
Stephen Bowling, "AN1047—Buck-Boost LED Driver Using the PIC16F885 MCU," Microchip Technology, Inc., 2006, 12 pages.
Motorola, "MC33362, High Voltage Switching Regulator, Semiconductor Technical Data" Rev. 2, 1996, 12 pages.

US 10,411,584 B2

START-UP CIRCUIT TO DISCHARGE EMI FILTER FOR POWER SAVING OF POWER SUPPLIES

REFERENCE TO RELATED APPLICATION

This Application is a continuation application of prior U.S. application Ser. No. 13/870,177 filed on Apr. 25, 2013 which was a Continuation Application of U.S. application Ser. No. 12/539,722, filed 12 Aug. 2009, now U.S. Pat. No. 8,461,915, which claims priority to U.S. provisional application no. 61/217,709, all of which are hereby incorporated herein by reference, and priority thereto is hereby claimed.

BACKGROUND OF THE INVENTION

Field of Invention

The present invention relates to a power supply, and more particularly, the present invention relates to a start-up circuit.

Description of Related Art

Switching mode power supplies have been widely used to provide regulated power for computers, home appliances, communication equipments, etc. In recent years, the problem of power saving in switching mode power supplies has drawn much attention. Based on the restriction of environmental pollution, the computer and other equipment manufactures have been striving to meet the power management and energy conservation requirements.

FIG. 1 shows a traditional approach for filtering electromagnetic interference (EMI) and providing a DC voltage. An EMI filter located between a power source $V_{AC}$ and a bridge rectifier 10 includes a choke $L_1$, X-capacitors $C_1$ and $C_2$. The X-capacitor $C_1$ is placed across the power source $V_{AC}$. The choke $L_1$ is coupled between the power source $V_{AC}$ and the bridge rectifier 10. The X-capacitor $C_2$ is coupled between the choke $L_1$ and an input of the bridge rectifier 10. A bulk capacitor $C_{IN}$ connected from an output of the bridge rectifier 10 to a ground is for stabilizing the DC voltage $V_{BUS}$ at the output of the bridge rectifier 10. For safety regulations in US and European, a bleeding resistor $R_D$ is generally placed across the X-capacitors $C_1$ or $C_2$ of the EMI filter. The bleeding resistor $R_D$ will discharge the stored energy at the X-capacitors $C_1$ and $C_2$ to prevent an electric shock when end-user cut off the power source $V_{AC}$. In fact, the bleeding resistor $R_D$ always has a fixed power-loss as long as the X-capacitors $C_1$ and $C_2$ have the stored voltage. Besides, for higher power source, the bleeding resistor $R_D$ consumes much standby-power when the power supply is operated at no-load. Therefore, the disadvantage of the traditional approach causes a poor power saving at light-load and no-load. Because of the existence of the X-capacitors, it has become a major concern to reduce the standby-power.

SUMMARY OF THE INVENTION

The start-up circuit to discharge EMI filter is for power saving of power supplies according to the present invention. It includes a detection circuit detecting a power source for generating a sample signal. A sample circuit is coupled to the detection circuit for generating a reset signal in response to the sample signal. The reset signal is for discharging a stored voltage of the EMI filter. The start-up circuit further includes a delay circuit coupled to the sample circuit for generating a discharging signal in response to the reset signal. The discharging signal is coupled to drive the detection circuit for discharging the stored voltage of an X-capacitor of the EMI filter when the sample signal is still larger than the reference signal over a period.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 shows a circuit diagram of a traditional EMI filter.

DETAILED DESCRIPTION OF PREFERRED EMBODIMENTS

Figure 1:
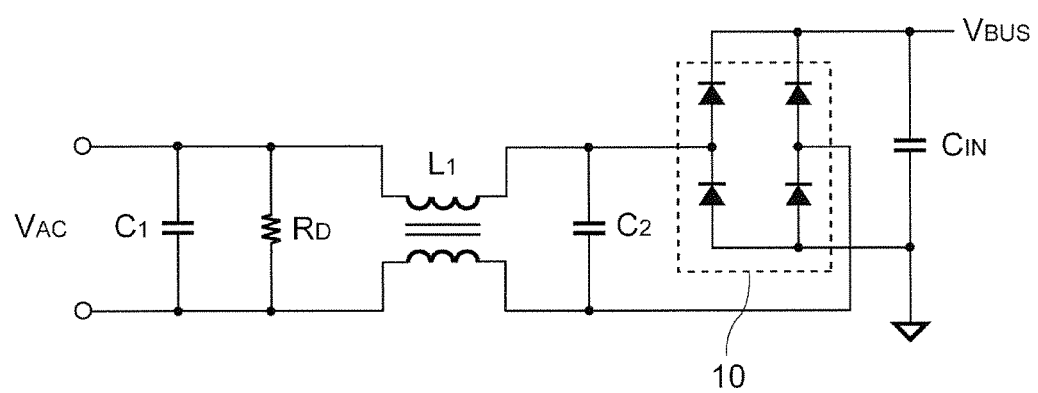
Figure 2:
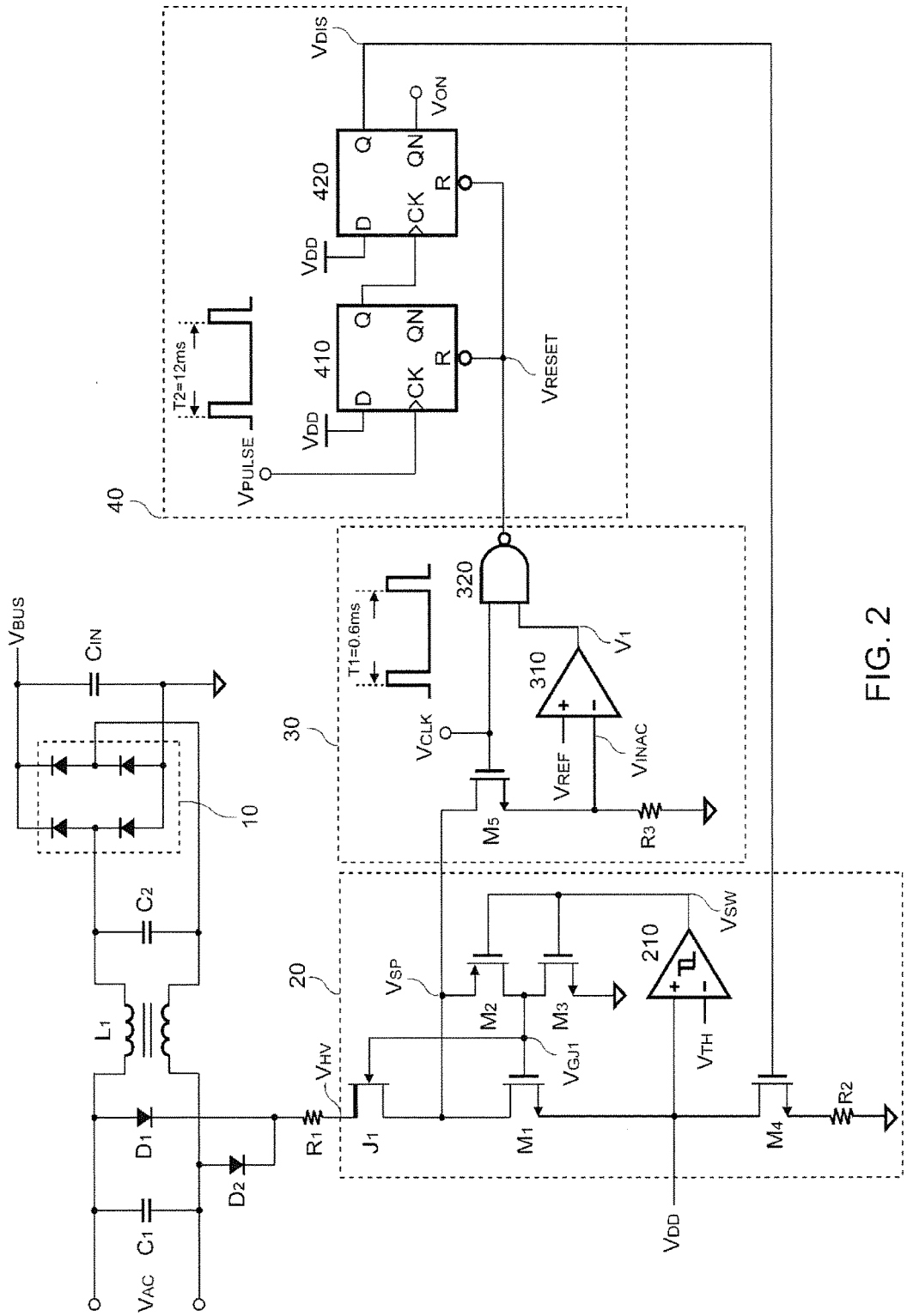
FIG. 2 shows a circuit diagram of a preferred embodiment of a start-up circuit according to the present invention.

FIG. 2 is a preferred embodiment of a start-up circuit according to the present invention. The start-up circuit is utilized to discharge the EMI filter for power saving of power supplies. The EMI filter includes the choke $L_1$, X-capacitors $C_1$ and $C_2$, the bulk capacitor $C_{IN}$, and the bridge rectifier 10 for filtering EMI and providing the DC voltage $V_{BUS}$. The start-up circuit includes a rectifier, a series resistor $R_1$, a detection circuit 20, a sample circuit 30 and a delay circuit 40. The rectifier can be a full-wave rectifier having a first diode $D_1$ and a second diode $D_2$ according to one embodiment of the present invention, Anodes of the first diode $D_1$ and the second diode $D_2$ are connected to the power source $V_{AC}$ respectively. Cathodes of the first diode $D_1$ and the second diode $D_2$ are together connected to one terminal of the series resistor $R_1$. The other terminal of the series resistor $R_1$ generates a high-voltage signal $V_{HV}$ through the full-wave rectification of the first diode $D_1$ and the second diode $D_2$. Thus, the rectifier is coupled to the power source $V_{AC}$ for rectifying the power source $V_{AC}$ to generate the high-voltage signal $V_{HV}$.

The detection circuit 20 is coupled to the series resistor $R_1$ for detecting the high-voltage signal $V_{HV}$ to generate a sample signal $V_{SP}$ and a supply voltage $V_{DD}$. Therefore, the detection circuit 20 detects the power source $V_{AC}$ for generating the sample signal $V_{SP}$ through detecting the high-voltage signal $V_{HV}$. The sample signal $V_{SP}$ is correlated to the high-voltage signal $V_{HV}$. The sample circuit 30 is coupled to the detection circuit 20 for generating a reset signal $V_{RESET}$ in response to a clock signal $V_{CLK}$ and the sample signal $V_{SP}$. The delay circuit 40 is coupled to the sample circuit 30 for generating a discharging signal $V_{DIS}$ and a power-on signal $V_{ON}$ in response to a pulse signal $V_{PULSE}$ and the reset signal $V_{RESET}$. The detection circuit 20 is coupled to the X-capacitors $C_1$ and $C_2$ of the EMI filter and receives the discharging signal $V_{DIS}$ for pulling down the supply voltage $V_{DD}$ and discharging the stored voltage of the X-capacitors $C_1$ and $C_2$. The power-on signal $V_{ON}$ is used for turning on a PWM circuit to regulate the output of the power supply. The PWM circuit is a prior-art technique, so here is no detailed description about it.

The detection circuit 20 includes a high-voltage switch $J_1$, a first transistor $M_1$, a switch circuit having a second transistor $M_2$ and a third transistor $M_3$, a fourth transistor $M_4$, a discharge resistor $R_2$ and a hysteresis comparator 210. The high-voltage switch $J_1$ formed by a Junction Field Effect Transistor (JFET) has a drain terminal coupled to the series resistor $R_1$ for receiving the high-voltage signal $V_{HV}$. The drain terminal of the high-voltage switch $J_1$ is further coupled to the X-capacitors $C_1$ and $C_2$ through the series resistor $R_1$, the first diode $D_1$ and the second diode $D_2$. The first transistor $M_1$ has a drain terminal coupled to a source terminal of the high-voltage switch $J_1$, a gate terminal coupled to a gate terminal of the high-voltage switch $J_1$. The sample signal $V_{SP}$ is generated at the source terminal of the high-voltage switch $J_1$ and the drain terminal of the first transistor $M_1$. A trigger signal $V_{GJ1}$ is generated at the gate terminals of the high-voltage switch $J_1$ and the first transistor $M_1$. The second transistor $M_2$ has a drain terminal coupled to the gate terminals of the high-voltage switch $J_1$ and the first transistor $M_1$, a source terminal coupled to the source terminal of the high-voltage switch $J_1$ and the drain terminal of the first transistor $M_1$ for receiving the sample signal $V_{SP}$. The third transistor $M_3$ has a drain terminal coupled to the drain terminal of the second transistor $M_2$ for receiving the trigger signal $V_{GJ1}$, a source terminal that is coupled to a ground, a gate terminal coupled to a gate terminal of the second transistor $M_2$.

The fourth transistor $M_4$ has a drain terminal coupled to a source terminal of the first transistor $M_1$, a source terminal coupled to one terminal of the discharge resistor $R_2$. The other terminal of the discharge resistor $R_2$ is coupled to the ground. A positive input of the hysteresis comparator 210 is coupled to the source terminal of the first transistor $M_1$ and the drain terminal of the fourth transistor $M_4$ for receiving the supply voltage $V_{DD}$. The hysteresis comparator 210 has a negative input to receive a threshold signal $V_{TH}$. An output of the hysteresis comparator 210 generates a switching signal $V_{SW}$ that is coupled to the gate terminals of the second transistor $M_2$ and the third transistor $M_3$. By comparing the supply voltage $V_{DD}$ with the threshold signal $V_{TH}$, the switching signal $V_{SW}$ is generated and controls an on/off status of the second transistor $M_2$ and the third transistor $M_3$. The hysteresis comparator 210 is only one embodiment of the present invention, and the prevent invention isn't limited to the hysteresis comparator 210. In this manner, the switching signal $V_{SW}$ is at a high-level once the supply voltage $V_{DD}$ is larger than an upper-limit of the threshold signal $V_{TH}$. On the contrary, the switching signal $V_{SW}$ is at a low-level once the supply voltage $V_{DD}$ is smaller than a lower-limit of the threshold signal $V_{TH}$. The lower-limit of the threshold signal $V_{TH}$ is also called under voltage lockout (UVLO). Because of the hysteresis characteristic of the hysteresis comparator 210, the difference between the upper-limit and the lower-limit always keeps a fixed voltage range.

The sample circuit 30 includes a fifth transistor $M_5$, a pull-down resistor $R_3$, a voltage comparator 310 and a NAND gate 320. The fifth transistor $M_5$ has a drain terminal coupled to the detection circuit 20 for receiving the sample signal $V_{SP}$, a source terminal coupled to one terminal of the pull-down resistor $R_3$ for generating an input signal $V_{INAC}$. The other terminal of the pull-down resistor $R_3$ is coupled to the ground. The voltage comparator 310 has a positive input receiving a reference signal $V_{REF}$, a negative input coupled to the source terminal of the fifth transistor $M_5$ for receiving the input signal $V_{INAC}$. The input signal $V_{INAC}$ is proportional to the high-voltage signal $V_{HV}$ and correlated to the sample signal $V_{SP}$ once the high-voltage switch $J_1$ and the fifth transistor $M_5$ are turned on. A first input of the NAND gate 320 coupled to a gate terminal of the fifth transistor $M_5$ receives the clock signal $V_{CLK}$. A period of the clock signal $V_{CLK}$ is $T_1$. A second input of the NAND gate 320 coupled to an output of the voltage comparator 310 receives a first signal $V_1$. The first signal $V_1$ is generated by comparing the input signal $V_{INAC}$ with the reference signal $V_{REF}$. The output of the NAND gate 320 generates the reset signal $V_{RESET}$. As mentioned above, the voltage comparator 310 is utilized for generating the reset signal $V_{RESET}$ in response to the sample signal $V_{SP}$ and the reference signal $V_{REF}$.

The delay circuit 40 includes a first flip-flop 410 and a second flip-flop 420. The first flip-flop 410 has an input D receiving the supply voltage $V_{DD}$, a clock-input CK receiving the pulse signal $V_{PULSE}$, a reset-input R receiving the reset signal $V_{RESET}$. A period of the pulse signal $V_{PULSE}$ is $T_2$. The period $T_2$ is much larger than the period $T_1$ about 20 times. The second flip-flop 420 has an input D receiving the supply voltage $V_{DD}$, a clock-input CK coupled to an output Q of the first flip-flop 410, a reset-input R receiving the reset signal $V_{RESET}$, an output Q generating the discharging signal $V_{DIS}$ coupled to a gate terminal of the fourth transistor $M_4$, an output QN generating the power-on signal $V_{ON}$ coupled to the PWM circuit to turn on the PWM circuit to regulate the output of the power supply.

Figure 3:
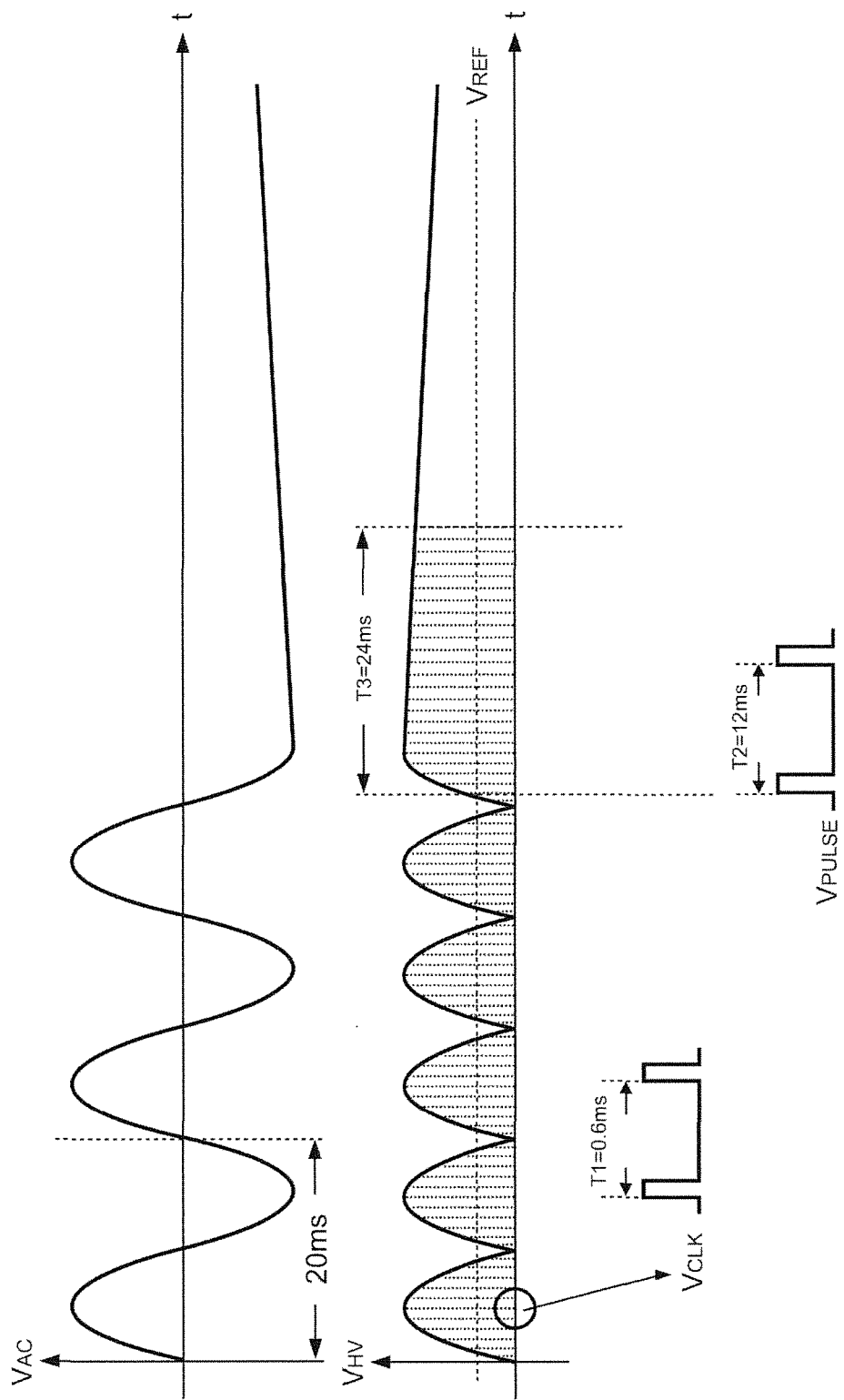
FIG. 3 shows the waveform of the power source and the high-voltage signal according to the present invention.

FIG. 3 shows the waveform of the power source and the high-voltage signal. The period of the power source $V_{AC}$ is about 20 ms if the input supply frequency is 50 Hz. The high-voltage signal $V_{HV}$ is generated through the full-wave rectification of the first diode $D_1$ and the second diode $D_2$. The clock signal $V_{CLK}$ is used to sample the high-voltage signal $V_{HV}$ for each period $T_1$. If the power source $V_{AC}$ is shut down in the peak value of the negative half-wave of the power source $V_{AC}$, the amplitude of the high-voltage signal $V_{HV}$ will last a high DC voltage for a long time. According to the present invention, the delay circuit 40 will count a period to be period $T_3$ and turned off the PWM circuit when the amplitude of the sample signal $V_{SP}$ is still larger than the reference signal V F over the period $T_3$. It means that the delay circuit 40 will turn off the PWM circuit when the high-voltage signal $V_{HV}$ is still larger than the reference signal $V_{REF}$ over the period $T_3$. In the meantime, the X-capacitors $C_1$ and $C_2$ of the EMI filter is discharged and the supply voltage $V_{DD}$ is pulled to UVLO. The period $T_3$ is equal to the period $T_2$ or higher than the period $T_2$.

Referring to the detection circuit 20 of FIG. 2, when the power source $V_{AC}$ is switched on, the drain terminal of the high-voltage switch $J_1$ receiving the high-voltage $V_{HV}$ is turned on immediately. The switching signal $V_{SW}$ is at a low-level since the supply voltage $V_{DD}$ doesn't be created yet. At this time, the third transistor $M_3$ is turned off and the second transistor $M_2$ is turned on. The sample signal $V_{SP}$ is about a threshold voltage of the second transistor $M_2$ and generated at the source terminal of the high-voltage switch $J_1$ and the drain terminal of the first transistor $M_1$. Because the second transistor $M_2$ is turned on, the trigger signal $V_{GJ1}$ is the same as the sample signal $V_{SP}$ and generated at the gate terminals of the high-voltage switch $J_1$ and the first transistor $M_1$. In the meantime, the first transistor $M_1$ is turned on and the supply voltage $V_{DD}$ is charged by the high-voltage signal $V_{HV}$. The first transistor $M_1$ serves as a charge transistor for charging the supply voltage $V_{DD}$. When the supply voltage $V_{DD}$ reaches to the upper-limit of the threshold signal $V_{TD}$, the switching signal $V_{SW}$ is at a high-level. At this time, the third transistor $M_3$ is turned on and the second transistor $M_2$ is turned off. Because the trigger signal $V_{GJ1}$ is pulled-down to the ground, the first transistor $M_1$ is turned off and the gate terminal of the high-voltage switch $J_1$ is at a low-level. During a short period, the source-to-gate voltage of the high-voltage switch $J_1$ will be higher than a threshold and the high-voltage switch $J_1$ is turned off.

Referring to the sample circuit 30 of FIG. 2, the fifth transistor $M_5$ is turned on once the clock signal $V_{CLK}$ is at a high-level. Because of the voltage drop in the pull-down resistor $R_3$, the source-to-gate voltage of the high-voltage switch $J_1$ will be lower than the threshold and the high-voltage switch $J_1$ is turned on. On the other hand, the high-voltage switch $J_1$ is turned off once the clock signal $V_{CLK}$ is at a low-level. The period $T_1$ of the clock signal $V_{CLK}$ is about 0.6 ms according to one embodiment of the present invention. When the power source $V_{CLK}$ is normal operation and the fifth transistor $M_5$ is turned on, the input signal $V_{INAC}$ with 120 Hz sinusoidal is proportional to the high-voltage signal $V_{HV}$. The first signal $V_1$ is generated by comparing the input signal $V_{INAC}$ with the reference signal $V_{REF}$. The first signal $V_1$ is at a high-level and the reset signal $V_{RESET}$ is generated once the input signal $V_{INAC}$ is smaller than the reference signal $V_{REF}$. At this time, the discharging signal $V_{DIS}$ at the output Q of the second flip-flop 420 is at a low-level and the fourth transistor $M_4$ is turned off whatever the pulse signal $V_{PULSE}$ is at a high-level or a low-level. The power-on signal $V_{ON}$ at the output QN of the second flip-flop 420 is at a high-level to turn on the PWM circuit. On the contrary, the first signal $V_1$ is at a low-level and the reset signal $V_{RESET}$ is at a high-level not to reset once the input signal $V_{INAC}$ is larger than the reference signal $V_{REF}$. The delay circuit 40 starts to count when the reset signal $V_{RESET}$ and the pulse signal $V_{PULSE}$ are at the high-level. Since the power source $V_{AC}$ is normal operation and the high-voltage signal $V_{HV}$ is sampled by the clock signal $V_{CLK}$, the input signal $V_{INAC}$ will be smaller than the reference signal $V_{REF}$ again. The discharging signal $V_{DIS}$ is at the low-level to turn off the fourth transistor $M_4$ and the power-on signal $V_{ON}$ is at the high-level to turn on the PWM circuit.

When the power source $V_{AC}$ is shut down, the high-voltage signal $V_{HV}$ will not be 120 Hz sinusoidal and also will last the high DC voltage. During the shut down moment, the supply voltage $V_{DD}$ keeps a fixed voltage and the switching signal $V_{SW}$ is at the high-level because the high-voltage signal $V_{HV}$ still has the high DC voltage. At this time, by sampling the high-voltage signal $V_{HV}$, the sample signal $V_{SP}$ is still larger than the reference signal $V_{REF}$. Therefore, the input signal $V_{INAC}$ is always larger than the reference signal $V_{REF}$. The delay circuit 40 will count the period $T_3$ through the pulse signal $V_{PULSE}$. The period $T_2$ of the pulse signal $V_{PULSE}$ is about 12 ms and the period $T_3$ is about 24 ms according to one embodiment of the present invention. The power-on signal $V_{ON}$ at the output QN of the second flip-flop 420 will be at a low-level to turn off the PWM circuit after the period $T_3$.

In the meantime, the discharging signal $V_{DIS}$ of the output Q of the second flip-flop 420 will be at a high-level to turn on the fourth transistor $M_4$ after the period $T_3$. Because of the voltage drop in the discharge resistor $R_2$, the supply voltage $V_{DD}$ will be lower than the lower-limit of the threshold signal $V_{TH}$. Therefore, the delay circuit 40 will turn off the PWM circuit and pull the supply voltage $V_{DD}$ to UVLO. The switching signal $V_{SW}$ is at the low-level and the third transistor $M_3$ is turned off after the supply voltage $V_{DD}$ is lower than the lower-limit of the threshold signal $V_{TH}$. At this time, the first transistor $M_1$ and the second transistor $M_2$ are turned on. The high-voltage switch $J_1$ is turned on in response to the difference between the source and gate terminals of the high-voltage switch $J_1$ is at a low-level. The stored voltage at the X-capacitors $C_1$ and $C_2$ of the EMI filter will be discharged at the series resistor $R_1$ and the discharge resistor $R_2$ through the on-status of the high-voltage switch $J_1$, the first transistor $M_1$ and the fourth transistor $M_4$. Thus, the present invention provides a discharge path to solve the drawback as mentioned above once the supply voltage $V_{DD}$ is lower than the lower-limit of the threshold signal $V_{TH}$.

According to the description above, when the sample signal $V_{SP}$ is still larger than the reference signal $V_{REF}$ over the period $T_3$, the discharging signal $V_{DIS}$ is at the high-level for driving the detection circuit 20 in response to the reset signal $V_{RESET}$. The discharging signal $V_{DIS}$ drives the detection circuit 20 for discharging the stored voltage of the X-capacitors $C_1$ and $C_2$ of the EMI filter and pulling down the supply voltage $V_{DD}$. Therefore, when the sample signal $V_{SP}$ is still larger than the reference signal $V_{REF}$ over the period, the reset signal $V_{RESET}$ is utilized for discharging the stored voltage of the X-capacitors $C_1$ and $C_2$ of the EMI filter and pulling down the supply voltage $V_{DD}$. The fourth transistor $M_4$ of the detection circuit 20 serves as a discharge transistor due to the stored voltage of the X-capacitors $C_1$ and $C_2$ is discharged through the fourth transistor $M_4$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A discharge circuit of an EMI filter having an X-capacitor comprising:
   a monitor circuit configured for coupling to the EMI filter for monitoring a power source;
   a first transistor of the monitor circuit configured for receiving a signal from the power source, the signal having a first waveform correlated to a waveform of the power source; and
   the monitor circuit configured to detect that the power source is shut down over a period of time and responsively enable the first transistor to provide a discharging path to conduct a discharge current from the EMI filter through the first transistor for discharging a stored voltage of the EMI filter wherein the discharging path is cut off when the power source is in an active state.

2. The discharge circuit of claim 1 wherein the first transistor is configured to form a sample signal having a second waveform that is representative of the waveform of the power source; and
   a detection circuit configured for providing the discharging path in response to detecting that the sample signal is larger than a reference signal over the period of time wherein the period of time is no less than a period of a waveform of the power source.

3. The discharge circuit of claim 2 further including a timer circuit configured to form the period of time wherein the timer circuit is reset in response to the sample signal having a value that is less than the reference signal.

4. The discharge circuit of claim 1 wherein the monitor circuit also enables the first transistor to conduct a charging current to form an operating voltage for the monitor circuit wherein the charging current is cut off when the first transistor is enabled to provide the discharging path.

5. The discharge circuit of claim 1 wherein the monitor circuit includes a detection circuit configured to receive a sample signal from the first transistor, and a comparator to compare the sample signal to a reference value.

6. The discharge circuit of claim 1 wherein the monitor circuit includes a second transistor coupled in series with the first transistor, the monitor circuit configured to enable the second transistor to provide the discharging path to conduct the discharge current through the first transistor and through the second transistor wherein the second transistor is disabled when the power source is in an active state.

7. The discharge circuit of claim 6 wherein the first transistor is configured to form a supply voltage for the monitor circuit and wherein enabling the second transistor discharges the supply voltage.

8. The discharge circuit of claim 6 wherein the first transistor is enabled while the power source is in the active state.

9. The discharge circuit of claim 1 wherein the monitor circuit includes a sample circuit configured to generate a reset signal to reset a timer circuit in response to a sample signal having a value less than a reference value wherein the sample signal is received from the first transistor.

10. The discharge circuit of claim 9 wherein the sample circuit includes a voltage comparator that compares the sample signal to reference signal and periodically resets the timer circuit in response to the active state of the power source.

11. The discharge circuit of claim 1 wherein the first transistor is a high-voltage switch configured to receive the signal and form a sample signal that is representative of the signal wherein the monitor circuit also includes:
a sample circuit including a comparator coupled to compare the sample signal to a reference signal and cause the sample circuit to reset a timer in response to the active state of the power source; and
a discharge transistor coupled to the high-voltage switch, the discharge transistor providing the discharging path to conduct the discharge current from the EMI filter through the high-voltage switch and through the discharge transistor wherein the discharge transistor is disabled in response to detecting the active state of the power source.

12. A method of configuring a circuit of an EMI filter comprising:
configuring a monitoring circuit to monitor an AC power source; and
configuring the monitoring circuit to detect the AC power source being shut down for a period of time and to responsively form a discharge path for discharging a stored energy of the EMI filter wherein the discharge path is disabled in response to the monitoring circuit detecting an active state of the AC power source.

13. The method of claim 12 further including configuring a high-voltage transistor to receive a signal that is representative the AC power source and to form a sample signal that is representative of the AC power source; and
coupling a discharge transistor to receive a discharge current from the high-voltage transistor wherein the discharge transistor is enabled to conduct the discharge current in response to the monitoring circuit detecting the AC power source being shut down for the period of time and is disabled otherwise.

14. The method of claim 13 further including configuring a sample and delay circuit to enable the discharge transistor in response to detecting that the sample signal is greater than a reference signal for the period of time wherein the discharge current is conducted from the EMI filter through the high-voltage transistor and the discharge transistor.

15. The method of claim 14 including configuring a comparator to compare the sample signal to the reference signal and to reset the delay circuit in response to detecting the sample signal less than the reference signal.

16. A method of configuring a discharge circuit for an EMI filer comprising:
configuring a high-voltage transistor to receive a signal that is representative of an AC power source and form a sample signal that is representative of the signal;
coupling a discharge transistor in series with the high-voltage transistor; and
configuring a delay circuit to enable the discharge transistor to conduct a discharge current from the EMI filter through the high-voltage transistor and through the discharge transistor in response to detecting that the AC power source is shut down over a period of time.

17. The method of claim 16 wherein detecting that the AC power source is shut down over the period of time includes configuring the delay circuit to detect the sample signal having a value greater than a reference value over the period of time.

18. The method of claim 17 further including configuring the delay circuit for being reset in response to the sample signal having a value less than the reference value.

19. The method of claim 16 including configuring the delay circuit to disable the discharge transistor in response to detecting an active state of the AC power source wherein the high-voltage transistor is enabled during a time of the active state of the AC power source.

* * * * *